United States Patent

Tahara et al.

[11] Patent Number: 5,979,035
[45] Date of Patent: Nov. 9, 1999

[54] METHOD OF PRODUCING METAL GASKET

[75] Inventors: Eiichi Tahara; Kōichi Tokuda; Fumio Kishi, all of Kanagawa, Japan

[73] Assignee: Nippon Reinz Co., Ltd., Kanagawa-Ken, Japan

[21] Appl. No.: 08/987,301

[22] Filed: Dec. 9, 1997

Related U.S. Application Data

[62] Division of application No. 08/784,181, Jan. 13, 1997, abandoned, which is a continuation of application No. 08/531,447, Sep. 21, 1995, abandoned.

[30] Foreign Application Priority Data

Dec. 16, 1994 [JP] Japan .................................. 6-313011
Jan. 20, 1995 [JP] Japan .................................. 7-7162

[51] Int. Cl.$^6$ .................................................. B23P 11/00
[52] U.S. Cl. ............................................. 29/432.2; 277/595
[58] Field of Search ................................. 29/432.2, 432, 29/509; 277/590, 595

[56] References Cited

U.S. PATENT DOCUMENTS 3,599,318  8/1971  Behlen ........................................ 29/509

*Primary Examiner*—P. W. Echols
*Assistant Examiner*—John C. Hong
*Attorney, Agent, or Firm*—Brinks Hofer Gilson & Lione

[57] ABSTRACT

A metal gasket is composed of a plurality of metal sheets superimposed one above the other and including a plurality of joints. Each of the joints includes a plurality of cut lines defining inner side edges of the metal sheets, and a bent portion located between the cut lines and having outer side edges which are frictionally engaged with the inner side edges of the metal sheets. The joints are oriented in different directions to accommodate a shear force.

3 Claims, 22 Drawing Sheets

METHOD OF PRODUCING METAL GASKET

This is a Division of application Ser. No. 08/784,181 filed Jan. 13, 1997, now abandoned, which is a continuation of application Ser. No. 08/531,447 filed Sep. 21, 1995, now abandoned.

BACKGROUND OF THE INVENTION

1. Field of the Invention

The present invention generally relates to a gasket placed between two mating surfaces to form a seal. More particularly, the present invention is directed to a metal gasket composed of a plurality of superimposed metal sheets, and a method of securing a plurality of metal sheets together to produce a metal gasket.

2. Description of the Related Art

Various types of metal gaskets are used throughout an automobile, particularly in an internal combustion engine. The joint between a cylinder block and a cylinder head must be sealed tight. It must hold the high pressure by combustion. The mating surfaces of the cylinder block and the cylinder head can not be machined smooth enough to provide the required seal. To this end, a head gasket is installed between the cylinder block and the cylinder head so as to prevent combustion leakage and loss of coolant or lubricant from the engine.

FIGS. 39 to 41 show part of a conventional metal gasket 1 shaped to fit a cylinder block (not shown), with all openings cut out. These openings include large openings 2 having a diameter equal to the diameter of each cylinder bore, a plurality of small openings 3 through which head bolts (not shown) are inserted to secure a cylinder head (not shown) to the cylinder block, and a plurality of openings 4 through which a coolant and a lubricant flow. As shown better in FIG. 41, the gasket 1 is composed of three thin sheets 5 to 7 made of metal and superimposed one above the other. Conventionally, grommets or eyelets are used to join the metal sheets 5 to 7 together. Specifically, a plurality of tongues or projections 8 extend horizontally from the outer periphery of each of the metal sheets. Each of the aligned projections 8 includes a through hole 8a to receive a grommet 9. The grommet 9 has a sleeve 9a, and two end flanges 9b extending radially outwardly from opposite ends of the sleeve 9a and adapted to clamp the inner peripheral edge of the projection 8 so as to secure the three metal sheets 5 to 7 together. Although the grommet 9 is durable and reliable, it is cumbersome to mount. The use of the grommet also increases the overall cost of the gasket.

As an alternative, spot welding could be used to easily secure a plurality of metal sheets. However, the spot welding can not be used in the case where coatings are applied to the surface of a metal gasket to provide a better seal.

SUMMARY OF THE INVENTION

Accordingly, it is an object of the present invention to provide a metal gasket wherein a plurality of metal sheets can easily and firmly be secured together.

It is another object of the present invention to provide a method of securing a plurality of metal sheets to produce a metal gasket, which is economical and reliable and which positively prevents displacement of the metal sheets.

According to a first aspect of the present invention, there is provided a metal gasket which comprises a plurality of metal sheets superimposed one above the other and including a plurality of joint means, each joint means including a plurality of cut lines defining inner side edges of the metal sheets, and a bent portion located between the cut lines and having outer side edges frictionally engaged with the inner side edges of the metal sheets. The joint means are oriented in different directions.

Joint means may be substantially rectangular and include a pair of substantially parallel cut lines. Alternatively, joint means may be substantially Y-shaped and include three separate, substantially L-shaped cut lines. Still alternatively, joint means may be substantially cross-shaped and include four separate, substantially arcuate cut lines.

The metal gasket may include an upper metal sheet, a lower metal sheet, and an intermediate metal sheet sandwiched between the upper metal sheet and the lower metal sheet and having a thickness greater than those of the upper and lower metal sheets. The intermediate sheet preferably includes a plurality of through holes within which a plurality of corresponding joint means are received. The bent portions have a thickness less than that of the metal gasket. Alternatively, the intermediate sheet may include a plurality of recesses within which a plurality of joint means are received.

According a second aspect of the present invention, there is provided a method of securing a plurality of superimposed metal sheets to produce a metal gasket with joint means, which comprises the steps of forming a protrusion substantially centrally in the joint means, cutting and plastically deforming part of the metal sheets to form a plurality of cut lines and a bent portion located between the cut lines and having outer side edges, the cut lines defining inner side edges of the metal sheets which are frictionally engaged with the corresponding outer side edges of the bent portion, and pressing and collapsing the protrusion to expand the bent portion, whereby the outer side edges of the bent portion extends substantially horizontally beyond the corresponding inner side edges of the metal sheets.

According to a third aspect of the present invention, there is provided a method of securing a plurality of superimposed metal sheets to produce a metal gasket with joint means, which comprises the steps of forming an aperture substantially centrally in the joint means, cutting and plastically deforming part of the metal sheets to form a plurality of cut lines and a bent portion located between the cut lines and having outer side edges, the cut lines defining inner side edges of the metal sheets which are frictionally engaged with the corresponding outer side edges of bent portion, and enlarging the aperture, whereby the outer side edges of the bent portion extend substantially horizontally beyond the inner side edges of the metal sheets.

According to a fourth aspect of the present invention, there is provided a method of securing a plurality of superimposed metal sheets to produce a metal gasket with joint means which comprises the steps of forming a plurality of apertures around the joint means, cutting and plastically deforming part of the metal sheets to form a plurality of cut lines, and a bent portion located between the cut lines and having outer side edges, the cut lines defining inner side edges of the metal sheets which are frictionally engaged with the corresponding outer side edges of the bent portion, and enlarging the apertures, whereby the inner side edges of the metal sheets extend substantially horizontally beyond the outer side edges of the bent portion.

According to a fifth aspect of the present invention, there is provided a method of securing a plurality of superimposed metal sheets to produce a metal gasket with joint means, which comprises the steps of forming a plurality of protrusions around the joint means, cutting and plastically deforming part of the metal sheets to form a plurality of cut lines, and a bent portion located between the cut lines and having outer side edges, the cut lines defining inner side edges of the metal sheets which are frictionally engaged with the corresponding outer side edges of the bent portion, and pressing and collapsing the protrusions to expand that part of metal sheets, whereby the inner side edges of the metal sheets extend substantially horizontally beyond the outer side edges of the bent portion.

According to a sixth aspect of the present invention, there is provided a method of securing a plurality of metal sheets to produce a metal gasket with joint means, which comprises the steps of cutting and plastically deforming part of the metal sheets to form a plurality of cut lines, and a bent portion located between the cut lines and having outer side edges, the cut lines defining inner side edges of the metal sheets, and simultaneously stretching that part of metal sheets, whereby burrs are left on the inner side edges of the metal sheets and engaged with each other.

BRIEF DESCRIPTION OF THE DRAWINGS

The present invention will now be described, by way of example, with reference to the accompanying drawings, in which.

DESCRIPTION OF PREFERRED EMBODIMENTS

Figure 1:
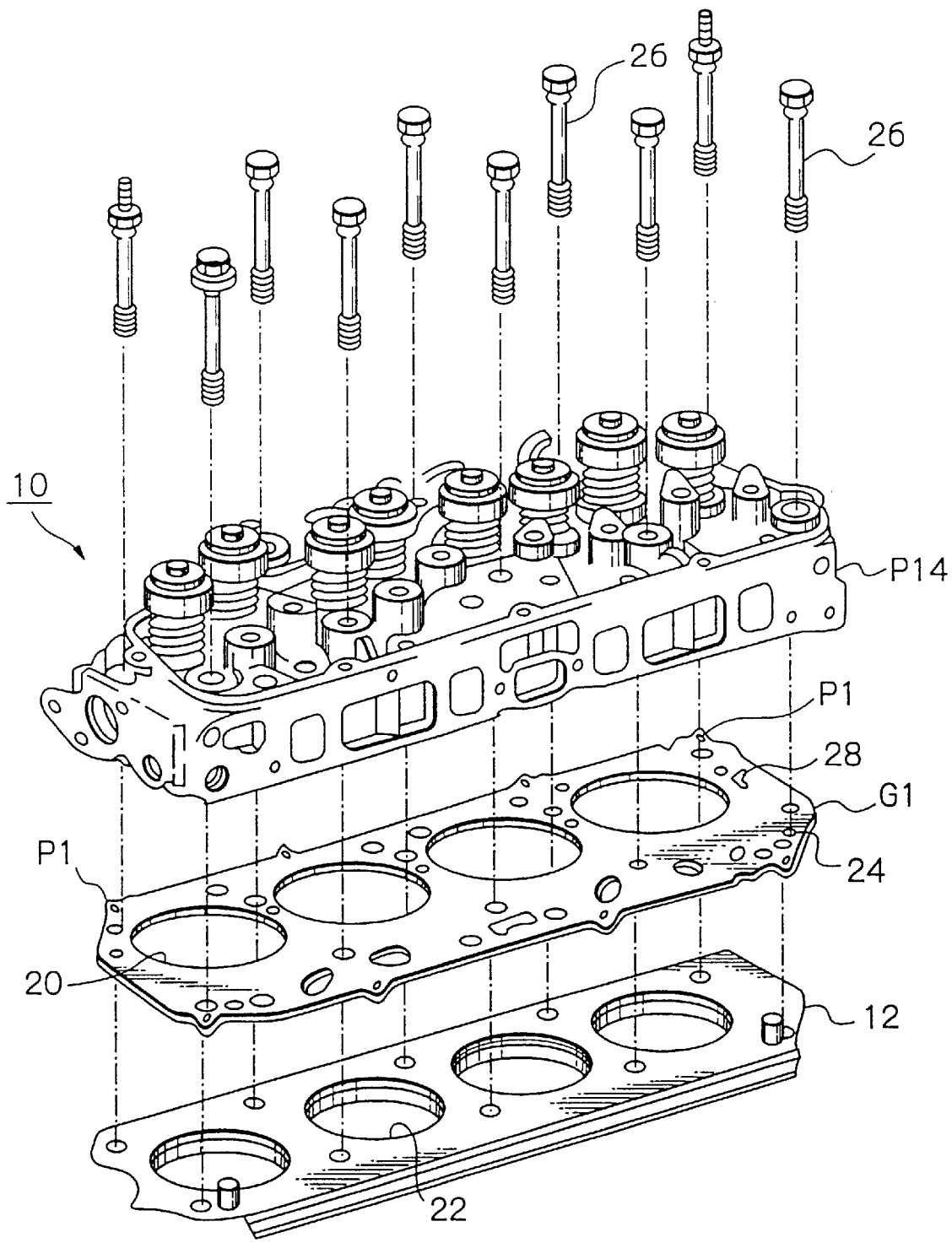
FIG. 1 is a disassembled view, in perspective, of a four-cylinder internal combustion engine wherein a metal gasket according to a first embodiment of the present invention is installed between a cylinder block and a cylinder head.

Referring first to FIG. 1, there is illustrated a four-cylinder internal combustion engine 10 composed of a cylinder block 12 and a cylinder head 14. A metal gasket G1 according to a first embodiment of the present invention is installed between the cylinder block 12 and the cylinder head 14 to prevent loss of fluid such as combustion gas and coolant. It will be appreciated that the present invention may also be applied to gaskets installed between other parts of an automobile, such as between one side of the cylinder head 14 and an exhaust manifold (not shown) and between the end flange of an exhaust pipe (not shown) and the end flange of a muffler or catalytic converter (not shown).

Figure 2:
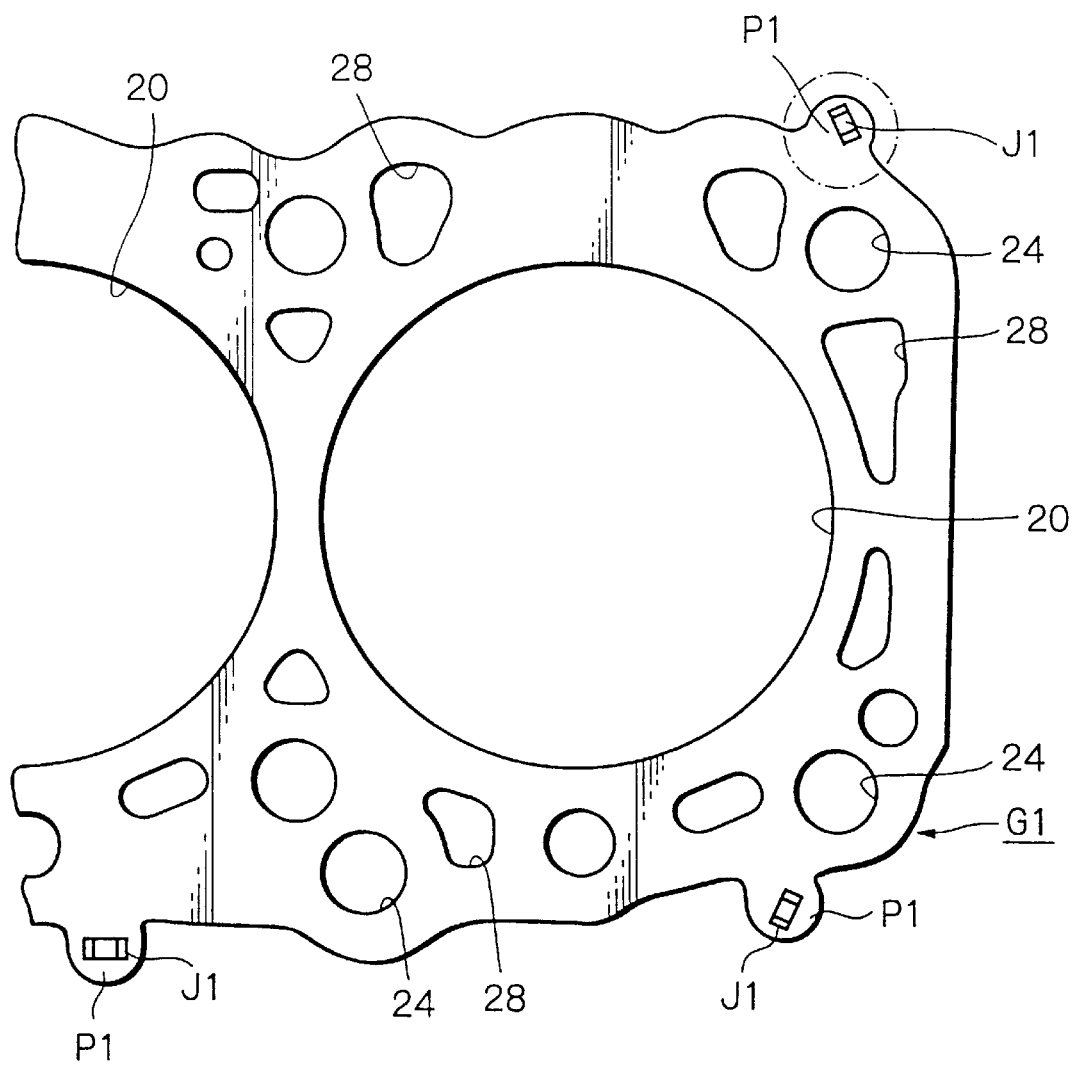
FIG. 2 is a partial plan view, on an enlarged scale, of the metal gasket shown in FIG. 1.

As shown better in FIG. 2, the head gasket G1 includes four openings 20 having a diameter substantially equal to the diameter of respective cylinder bores 22, a plurality of small openings 24 through which a plurality of corresponding head bolts 26 are inserted to secure the cylinder head 14 to the cylinder block 12, and a plurality of openings 28 through which a coolant or a lubricant flow.

Figure 3:
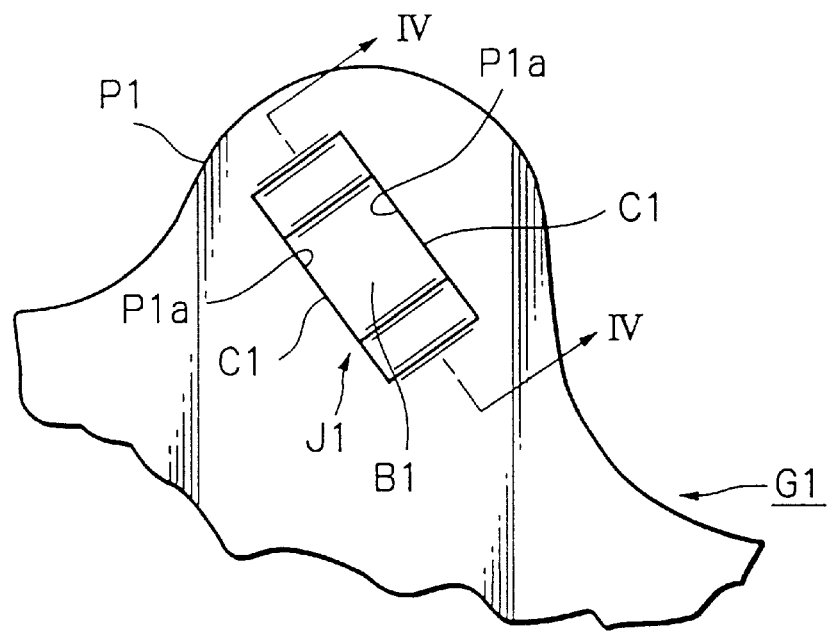
FIG. 3 is a plan view, on an enlarged scale, of part of the metal gasket as encircled in FIG. 2.
Figure 4:
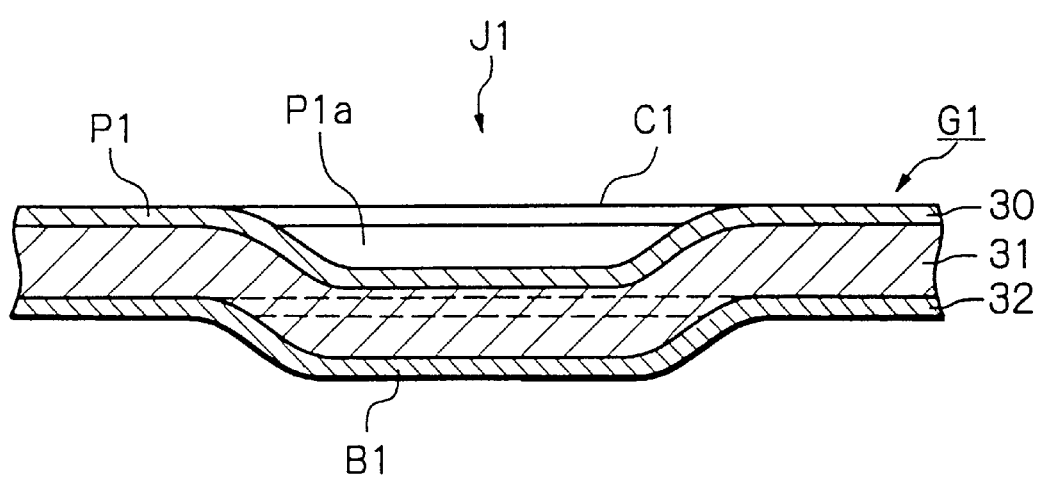
FIG. 4 is a sectional view, on an enlarged scale, taken along the line of IV—IV of FIG. 3.

Referring to FIGS. 3 and 4, the head gasket G1 has a thickness of approximately 0.20 to 0.30 mm and is composed of three thin sheets, an upper sheet 30, an intermediate sheet 31 and a lower sheet 32, all made of metal such as stainless steel or zinc-plated steel. In order to firmly secure these metal sheets 30 to 32, a plurality of tongues or projections P1 extend substantially horizontally from the outer periphery of the head gasket G1 and are spaced along the outer periphery of the head gasket G1 (see FIG. 1). The projections P1 are located outside of the outer contour of the cylinder block 12 and the cylinder head 14 and will in no way deteriorate the seal integrity between the block 12 and the head 14. A part of the projection P1 is cut and plastically deformed or bent downwardly by a suitable punch-and-die assembly in order to form a joint J1. As a result, a pair of straight cut lines C1 are formed in each of the projections P1 and extend substantially parallel to each other. The joint J1 is substantially rectangular as viewed in plan and has a bent portion B1 which partly extends downwardly from the bottom of the head gasket G1. The bent portion B1 has opposite outer sides edges B1a (see FIG. 5) which are frictionally engaged with opposite inner side edges P1a of the projection P1 so as to firmly secure the three metal sheets 30 to 32 together.

Figure 5:
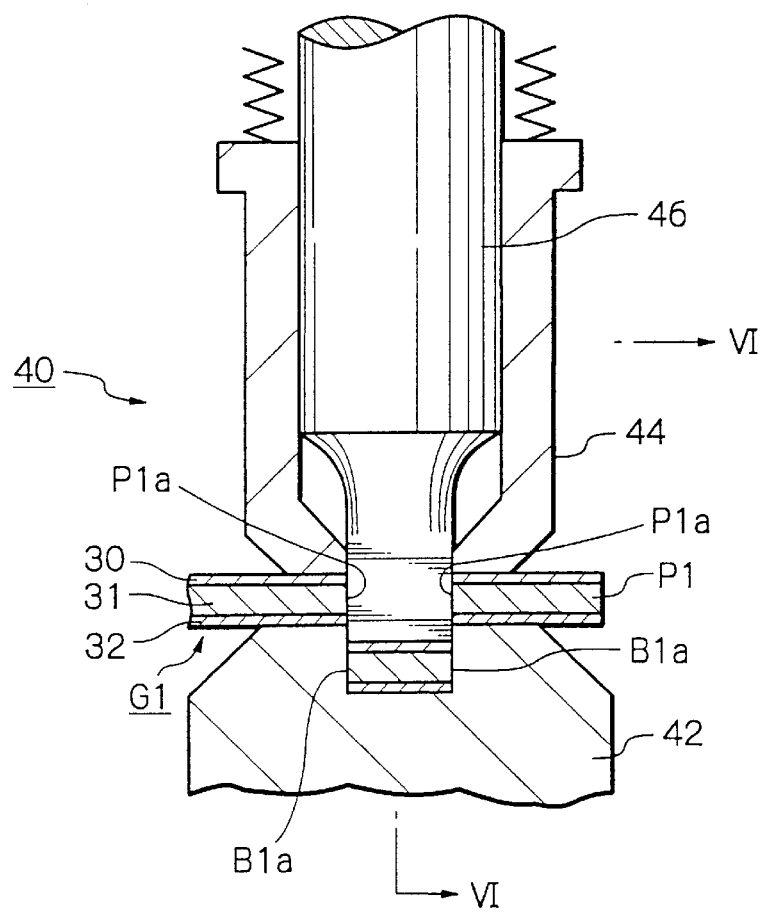
FIG. 5 is a vertical sectional view of a punch-and-die assembly used to form joints in the metal gasket shown in FIG. 1.
Figure 6:
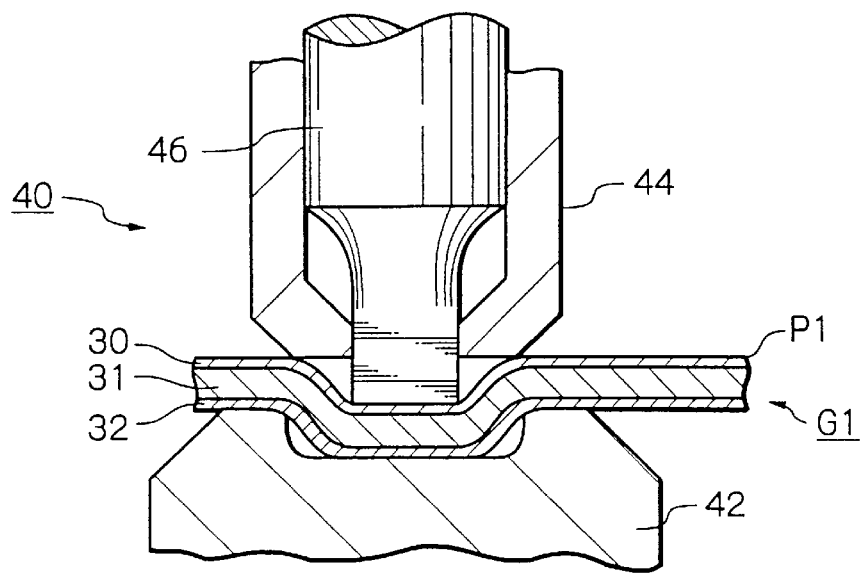
FIG. 6 is a vertical sectional view taken along the line VI—VI of FIG. 5.

FIGS. 5 and 6 show a punch-and-die assembly 40 used to cut and plastically deform part of the projection P1. The punch-and-die assembly 40 generally comprises a die 42 on which the head gasket G1 is placed, a cylindrical jig 44 located above the die 42 and adapted to urge the head gasket G1 against the top of the die 42, and a punch 46 disposed within the jig 44 and moved toward and away from the die 42. First, the head gasket G1 is placed on the top of the die 42. Then, the jig 44 is moved toward the die 42 to sandwich the projection P1 of the head gasket G1 between the lower end of the jig 44 and the upper surface of the die 42. The punch 46 is thereafter moved downwardly to press part of the projection P1 of the head gasket G1 against the die 42. As a result, that part of the projection P1 is simultaneously cut and bent downwardly to form a rectangular joint as shown in FIGS. 5 and 6. Advantageously, this method of securing the metal sheets eliminates the need for grommets or other securing means.

The head gasket G1 is subjected to thermal expansion and contraction when the engine 10 is repeatedly operated and stopped. As this occurs, a shear force is applied to the head gasket G1 in a direction substantially perpendicular to the direction in which the metal sheets 30 to 32 are superimposed one above the other. The strength of the joint decreases when the shear force is applied to the head gasket G1 in a direction substantially identical to the direction in which the cut lines C1 extend. This would result in displacement of the metal sheets 30 to 32 in a direction substantially parallel to the direction in which the surfaces of the metal sheets 30 to 32 extend. To this end, a plurality of cut lines C1 or joints J1 preferably extend in different directions so as to accommodate such a shear force. A plurality of dies and punches are preferably arranged in a random fashion to simultaneously produce and orient a plurality of joints in different directions.

Figure 7:
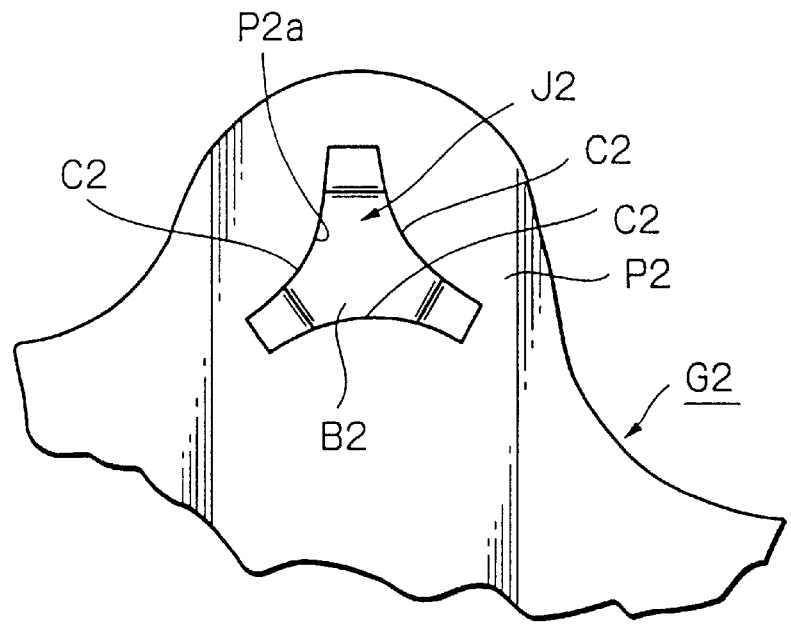
FIG. 7 is a view similar to FIG. 3, but showing a Y-shaped joint formed according to a second embodiment of the present invention.
Figure 8:
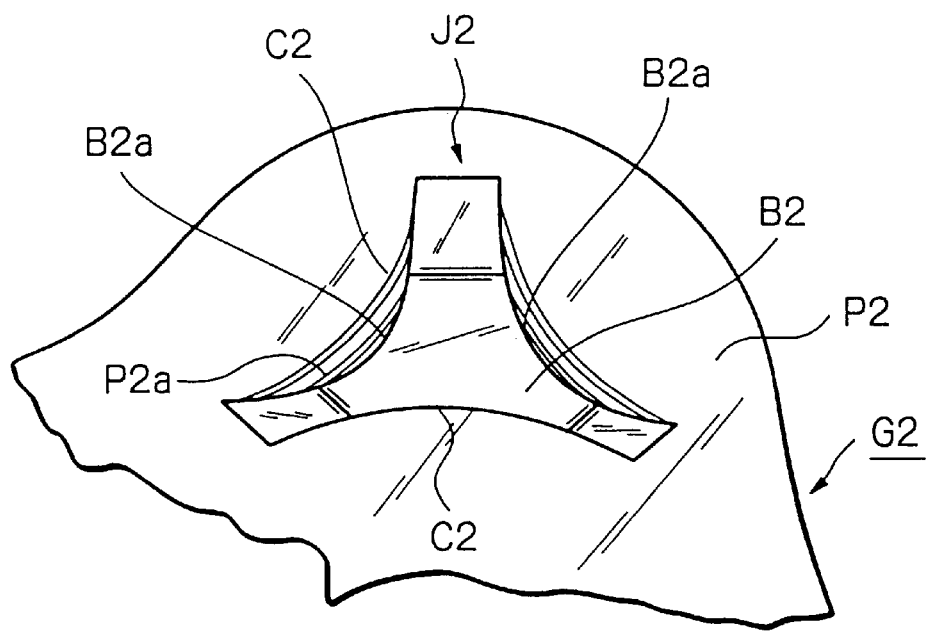
FIG. 8 is a perspective view of the Y-shaped joint shown in FIG. 7.

FIGS. 7 and 8 show a head gasket G2 made according to a second embodiment of the present invention and installed between the cylinder block 12 and the cylinder head 14 (see FIG. 1). The second embodiment differs from the first embodiment only in the sense that in the second embodiment, a joint has a Y-shape as viewed in plan.

Referring specifically to FIG. 7, the head gasket G2 is composed of three metal sheets (only one is shown) superimposed one above the other as in the first embodiment. A Y-shaped joint J2 is formed in each projection P2 of the head gasket G2 and includes a bent portion B2. The bent portion B2 partly extends below the bottom of the head gasket G2 and has three outer side edges B2a. Three separate arcuate cut lines C2 are formed in the projection P2 when part of the projection P2 is cut and plastically deformed by a suitable punch-and-die assembly. The bent portion B2 has three concaved side edges B2a which are frictionally engaged with the inner convexed side edges P2a of the projection P2 to firmly secure the three metal sheets together as in the first embodiment. Advantageously, the three cut lines C2 all extend in different directions. When a shear force is applied to the head gasket G2 in one direction, at least two mating side edges of the projection P2 and the bent portion B2 cooperate to accommodate such a shear force and prevent displacement of the three metal sheets.

Figure 9:
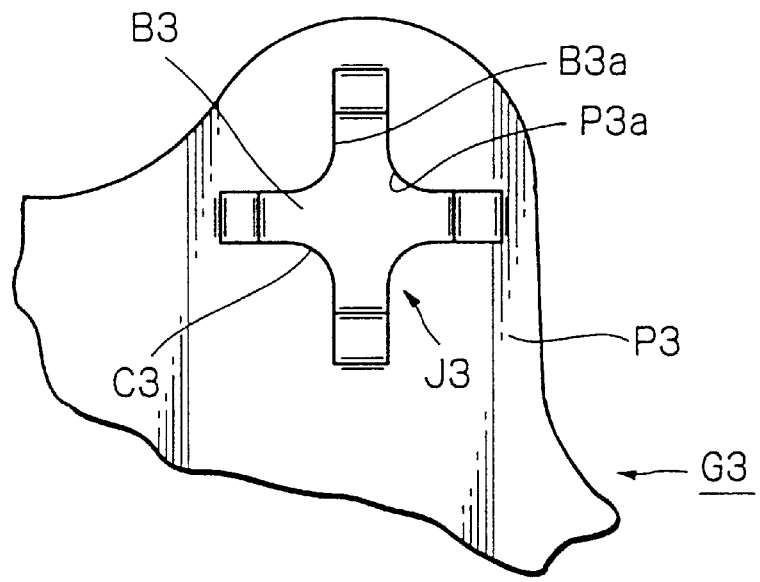
FIG. 9 is a view similar to FIG. 3, but showing a cross-shaped joint formed according to a third embodiment of the present invention.

FIG. 9 shows a head gasket G3 installed between the cylinder block 12 and the cylinder head 14 and made according to a third embodiment of the present invention. The third embodiment differs from the first embodiment only in the sense that in the third embodiment, a joint has a cross shape as viewed in plan.

Specifically, the head gasket G3 is composed of three metal sheets (only one is shown) superimposed one above the other as in the first embodiment. A cross-shaped joint J3 is formed in each projection P3 of the head gasket G3 and includes a bent portion B3. The bent portion B3 partly extends below the bottom of the head gasket G3 and has eight outer side edges B3a. Four separate, substantially L-shaped or arcuate cut lines C3 are formed in the projection P3 when part of the projection P3 is cut and plastically deformed by a suitable punch-and-die assembly. The four side edges B3a of the bent portion B3 are frictionally engaged with the inner side edges P3a of the projection P3 to firmly secure the three metal sheets together as in the first embodiment. Of eight mating sides edges, four mating side edges extend at right angles to the other four mating side edges. As such, when a shear force is applied to the head gasket G3 in a direction substantially parallel to the first four side edges, the other four mating side edges cooperate to effectively accommodate such a shear force and prevent displacement of the three metal sheets.

In the first to three embodiments, the bent portions B1 to B3 extend below the head gasket G1 to G3, respectively. Alternatively, adjacent bent portions may alternately extend above and below the head gasket. This arrangement prevents bending of the three metal sheets and maintains the three metal sheets as flat as possible.

Figure 10:
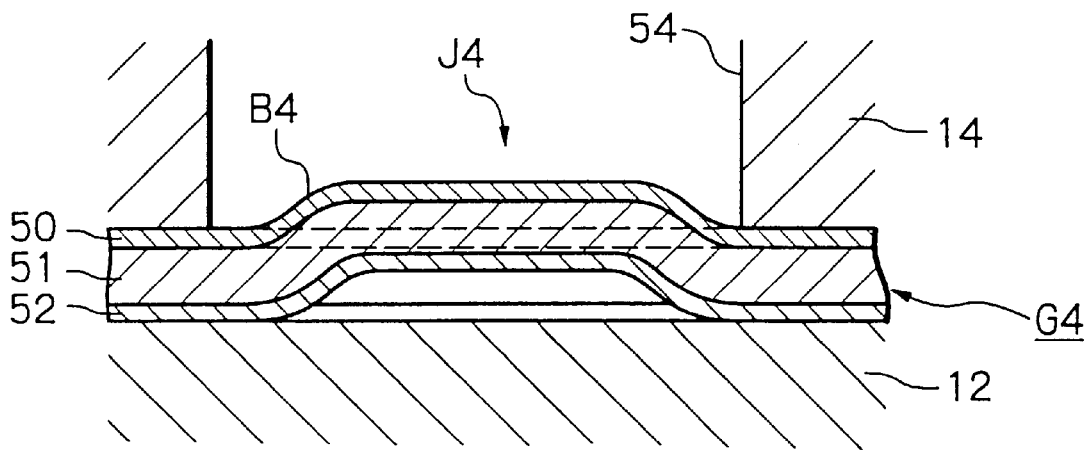
FIG. 10 is a partial sectional view of a joint formed according to a fourth embodiment of the present invention and received within a cavity of the cylinder head.

FIG. 10 shows a head gasket G4 made according to a fourth embodiment of the present invention and installed between the cylinder block 12 and the cylinder head 14 (see FIG. 1). In this particular embodiment, no projection is formed in the head gasket G4. In other words, joints are formed within the contour of the head gasket G4 without interfering with the cylinder block 12 or the cylinder head 14. Typically, when the cylinder head 14 is cast from a suitable metal, a plurality of cores made from sand or loam are placed in a mold to provide holes or cavities in the casting. Conveniently, these cavities can be used to receive joints.

Referring specifically to FIG. 10, the head gasket G4 is composed of three metal sheets 50 to 52. The head gasket G4 is partly cut and plastically deformed to provide a plurality of joints J4 (only one is shown in FIG. 10). The joint J4 may take any shape and has a bent portion B4 which partly extends above the top surface of the head gasket G4 and is conveniently received within a cavity 54 formed in the bottom of the cylinder head 14. This arrangement provides more space for engine accessories and reduces the overall weight of the head gasket. As an alternative, the cavity 54 may be formed in the top of the cylinder block 12. In such a case, the joint may have a bent portion which partly extend below the bottom of the head gasket G4.

Figure 11:
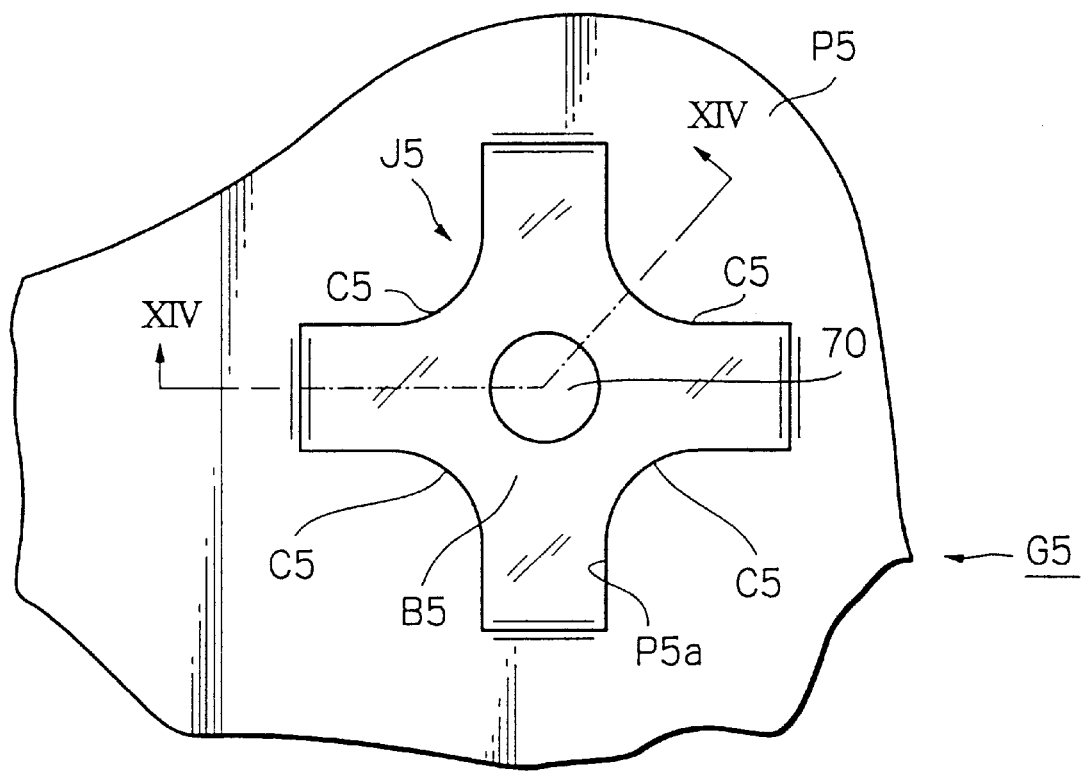
FIG. 11 is a partial plan view of a head gasket made according to a fifth embodiment of the present invention.
Figure 12:
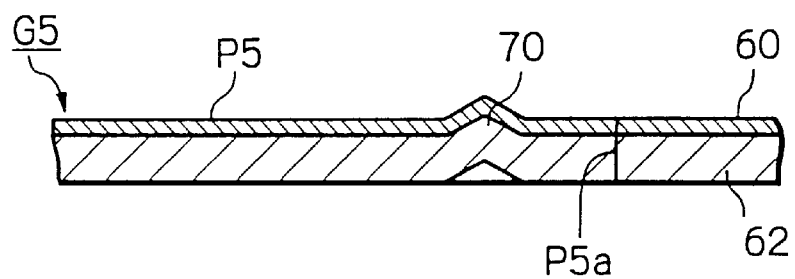
FIG. 12 is a partial sectional view showing a protrusion formed in the head gasket shown in FIG. 11.

Referring next to FIGS. 11 and 12, there is shown a head gasket G5 made according to a fifth embodiment of the present invention and installed between the cylinder block 12 and the cylinder head 14. In the illustrated embodiment, the head gasket G5 is composed of two thin sheets, an upper sheet 60 and a lower sheet 62 superimposed one above the other and both made of metal. It will be appreciated that the head gasket G5 may be composed of three or more metal sheets. The head gasket G5 includes a plurality of projections P5 (only one is shown in FIG. 11) at its outer periphery. Part of the projection P5 is cut and plastically deformed or bent downwardly to form a joint J5. As a result, four substantially L-shaped or arcuate cut lines C5 are symmetrically formed in the projection P5. The joint J5 is intended to secure the two metal sheets 60 and 62 together and has a substantially cross-shape as viewed in plan. The joint J5 also has a bent portion B5 with four L-shaped or arcuate side edges B5a (see FIG. 14). The bent portion B5 partly extends below the bottom of the head gasket G5 as shown in FIGS. 13 and 14.

Figure 13:
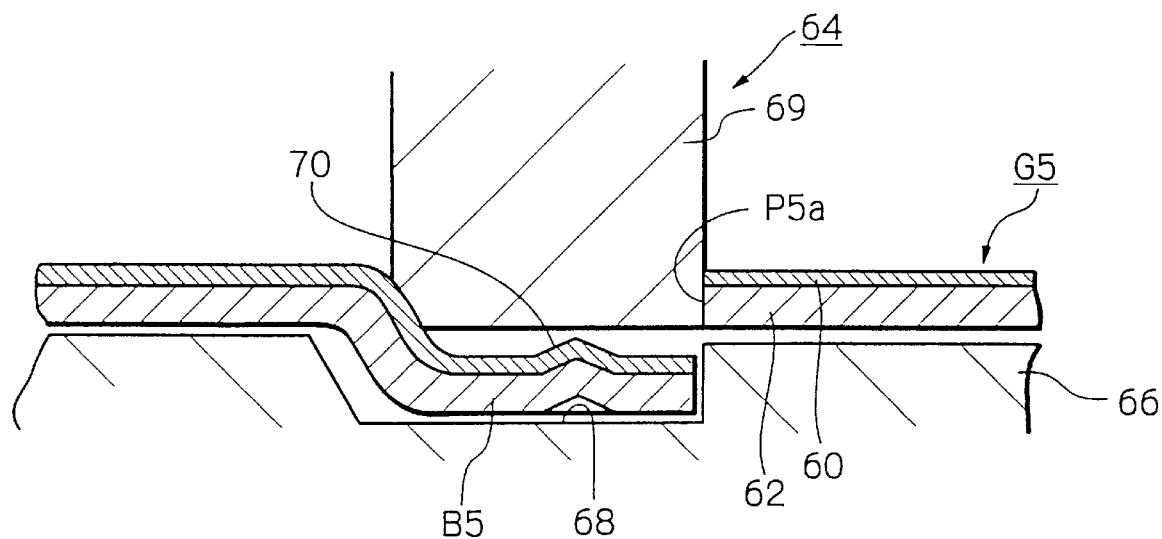
FIG. 13 is a partial sectional view showing a punch-and-die assembly used to produce a joint.
Figure 14:
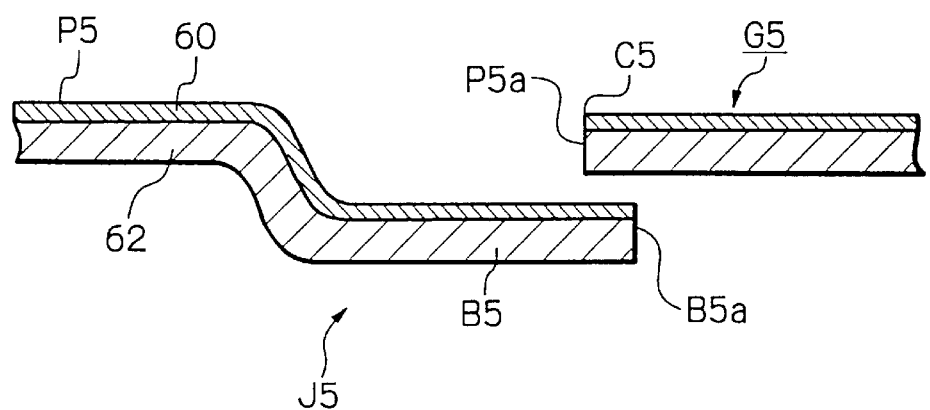
FIG. 14 is a partial sectional view of the joint after the head gasket has been removed from the assembly.

FIG. 13 shows a punch-and-die assembly 64 used to form the joint J5 in the projection P5. The punch-and-die assembly 64 generally comprises a die 66 having a substantially cross-shaped recess 68, and a punch 69 located above the die 66 and moved toward and away from the die 66. As shown in FIGS. 12 and 13, part of the projection P5 is raised to form a conical or semispherical protrusion 70 by means of a conventional press machine (not shown) before the joint J5 is formed. The head gasket G5 is placed on the top of the die 66, with the protrusion 70 of the projection P5 being positioned immediately above the recess 68. Then, the punch 69 is lowered to press the projection P5 toward the die 66. As a result, the protrusion 70 is slightly deformed or collapsed. Subsequent downward movement of the punch 69 causes part of the projection P5 adjacent to the protrusion 70 to be cut and plastically deformed to form the joint J5. The protrusion 70 is completely collapsed and made substantially flush with the head gasket G5 when the bent portion B5 is strongly pressed between the lower end of the punch 69 and the bottom of the recess 68. The bent portion B5 is thus compressed within the recess 68. When the joint J5 is removed from the recess 68, the bent portion B5 is expanded outwards and extends horizontally beyond the inner side edges P5a of the projection P5 as shown, in a somewhat exaggerated manner, in FIG. 14. As shown best in FIG. 14, the outer side edges B5a of the bent portion B5 overlie the inner side edges P5a of the projection P5 which extend along the cut lines C5, as viewed in plan. This arrangement effectively prevents the joint J5 from being moved beyond the upper surface of the head gasket G5.

As in the foregoing embodiments, the four arcuate or concaved side edges B5a of the bent portion B5 are frictionally engaged with the corresponding arcuate inner side edges P5a of the projection P5 adjacent to the cut lines C5. This engagement positively prevents displacement of the two metal sheets.

Figure 15:
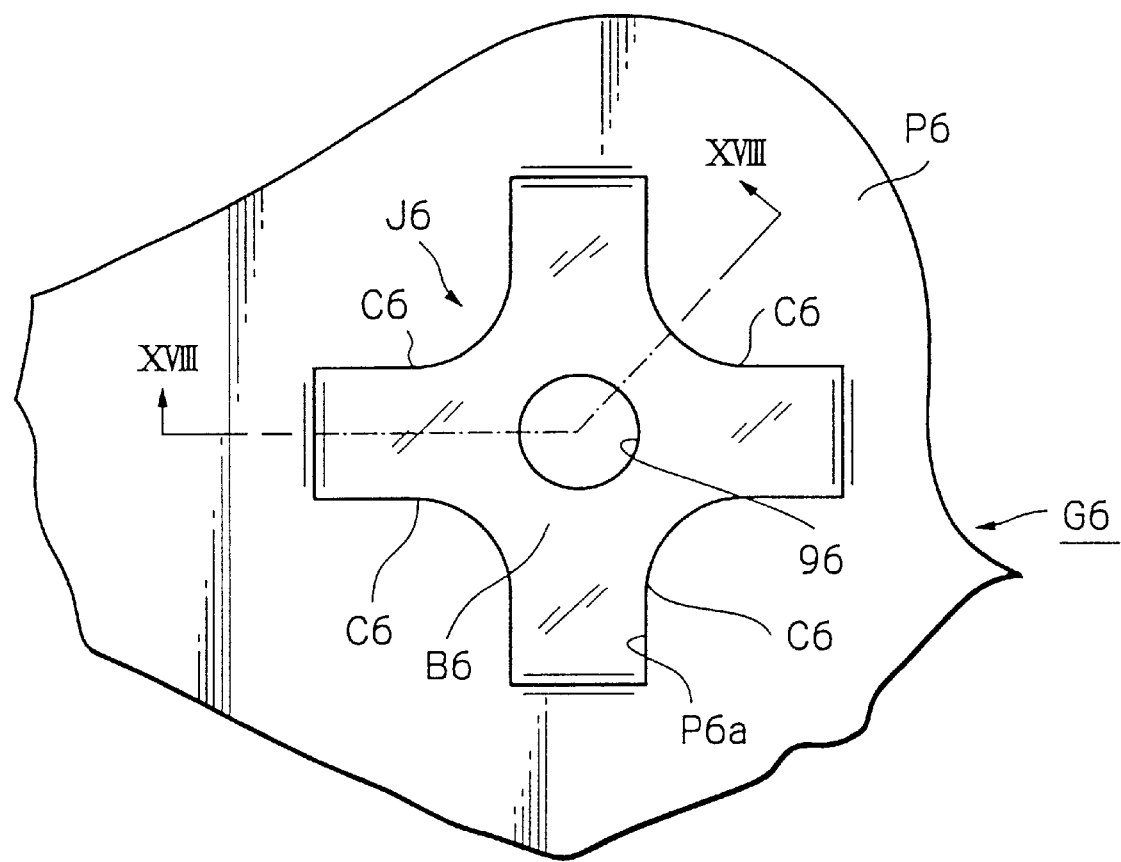
FIG. 15 is a view similar to FIG. 11, but showing a head gasket made according to a sixth embodiment of the present invention.
Figure 16:
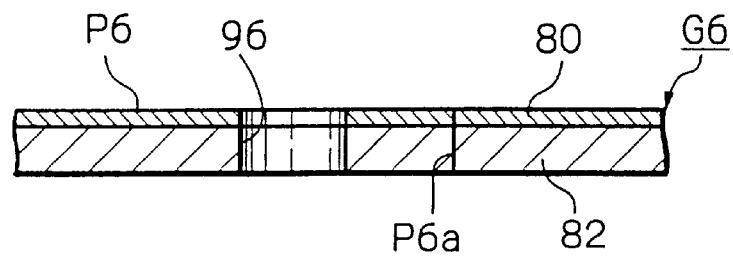
FIG. 16 is a partial sectional view showing an aperture formed in the head gasket shown in FIG. 15.

Referring to FIGS. 15 and 16, there is shown a head gasket G6 made according to a sixth embodiment of the present invention and installed between the cylinder block 12 and the cylinder head 14. In the illustrated embodiment, the head gasket G6 is composed of two sheets, an upper sheet 80 and a lower sheet 82 superimposed one above the other and both made of metal. The head gasket G6 includes a plurality of projections P6 (only one is shown in FIG. 15) at its outer periphery. Part of the projection P6 is simultaneously cut and plastically deformed or bent downwardly to form a joint J6. As a result, four substantially L-shaped or arcuate cut lines C6 are symmetrically formed in the projection P6. As in the fifth embodiment, the joint J6 is intended to secure the two metal sheets 80 and 82 together and has a substantially cross-shape as viewed in plan. The joint J6 also has a bent portion B6 with four L-shaped or arcuate side edges B6a (see FIG. 18). The bent portion B6 partly extends below the bottom of the head gasket G6 as shown in FIGS. 17 and 18.

Figure 17:
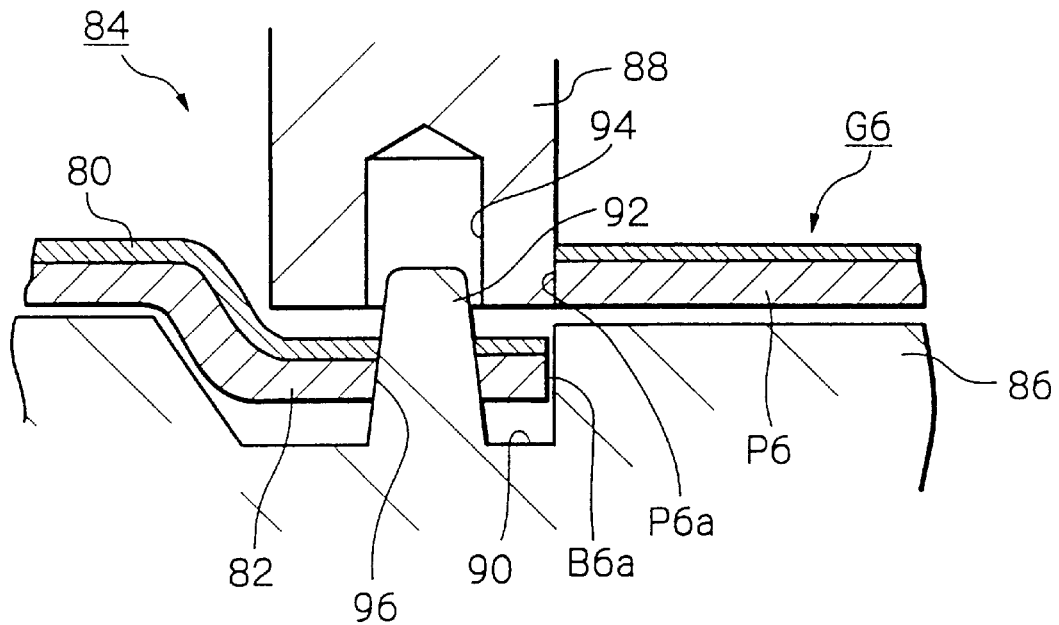
FIG. 17 is a partial sectional view showing a punch and-die assembly used to produce a joint.
Figure 18:
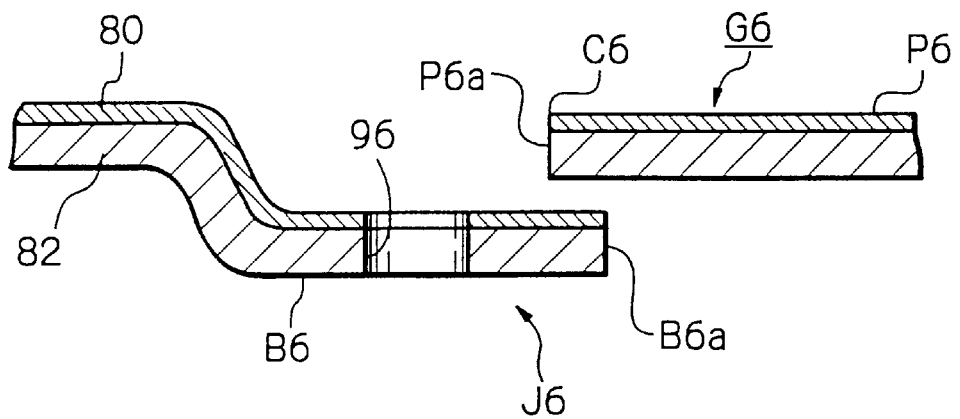
FIG. 18 is a partial sectional view showing the joint after the head gasket has been removed from the assembly.

FIG. 17 shows a punch-and-die assembly 84 used to cut and plastically deform part of the projection P6. The punch-and-die assembly 84 generally comprises a die 86, and a punch 88 located above the die 86 and moved to and from the die 86. The die 86 includes a recess 90, and a taper pin 92 extending upwardly from the bottom of the recess 90. The punch 88 includes a counterbore 94 to receive the taper pin 92 when the punch 88 enters the recess 90 of the die 86.

Part of the projection P6 is die-cut to define a circular aperture 96 before the joint J6 is formed. The aperture 96 has a diameter slightly greater than the upper end of the taper pin 92, but slightly less than the lower end of the taper pin 92. Also, the lower end of the counterbore 94 is slightly greater in diameter than the aperture 96. The head gasket G6 is first placed on the top of the die 86, with the taper pin 92 being slightly inserted into the aperture 96. The punch 88 is then lowered to press part of the projection P6. As a result, that part of the projection P6 is cut and plastically deformed to form the joint J6 with the bent portion B6 partly projecting from the lower surface of the projection P6. When the bent portion B6 is pressed between the lower end of the punch 88 and the bottom of the recess 90, the aperture 96 is enlarged or widened since the diameter of the lower end of the taper pin 92 is greater than the initial diameter of the aperture 96. The bent portion B5 is thus compressed within the recess 90 of the die 86. When the bent portion B6 or the joint J6 is removed from the recess 90, the bent portion B6 is expanded outwards. As a result, the outer side edges B6a of the bent portion B6 extends horizontally beyond the inner side edges P6a of the projection P6. As shown best in FIG. 18, the outer side edges B6a of the bent portion B6 thus overlie the inner side edges P6a of the projection P6 which extend along the cut lines C6, as viewed in plan. This arrangement effectively prevents the joint J6 from being moved beyond the upper surface of the head gasket G6.

As in the foregoing embodiments, the four arcuate or concaved side edges B6a of the bent portion B6 are frictionally engaged with the inner arcuate side edges P6a of the projection P6 adjacent to the cut lines C6. This engagement positively prevents displacement of the two metal sheets 80 and 82.

Figure 19:
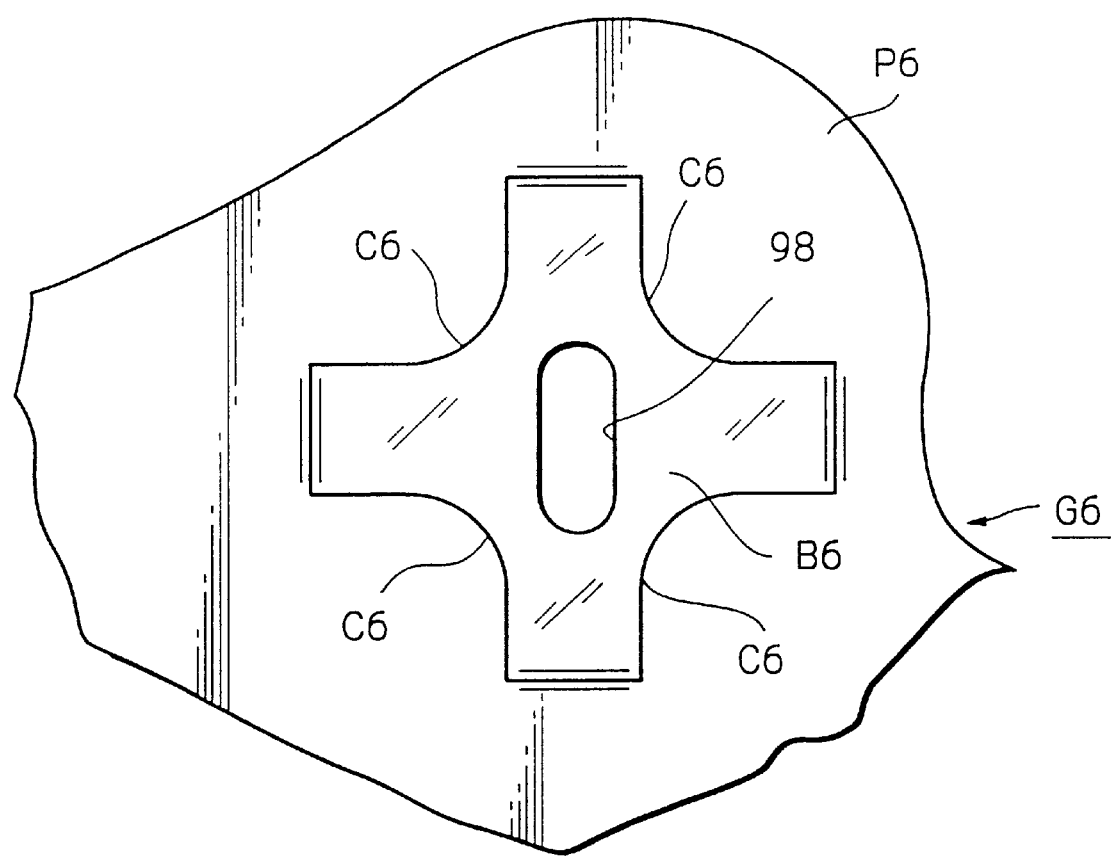
FIG. 19 is a view similar to FIG. 15, but showing an alternative form of the joint.

Referring to FIG. 19 wherein like reference numerals designate like or corresponding parts, the bent portion B6 may alternatively have an oblong aperture as indicated by the reference numeral 98. In such a case, the taper pin may have an oblong cross section. Instead, a hand tool such as a screwdriver may be used to widen or enlarge the aperture 98. Although not specifically shown in the drawings, it will be obvious to one of ordinary skill in the art that the joint may take a rectangular or other shapes.

Figure 20:
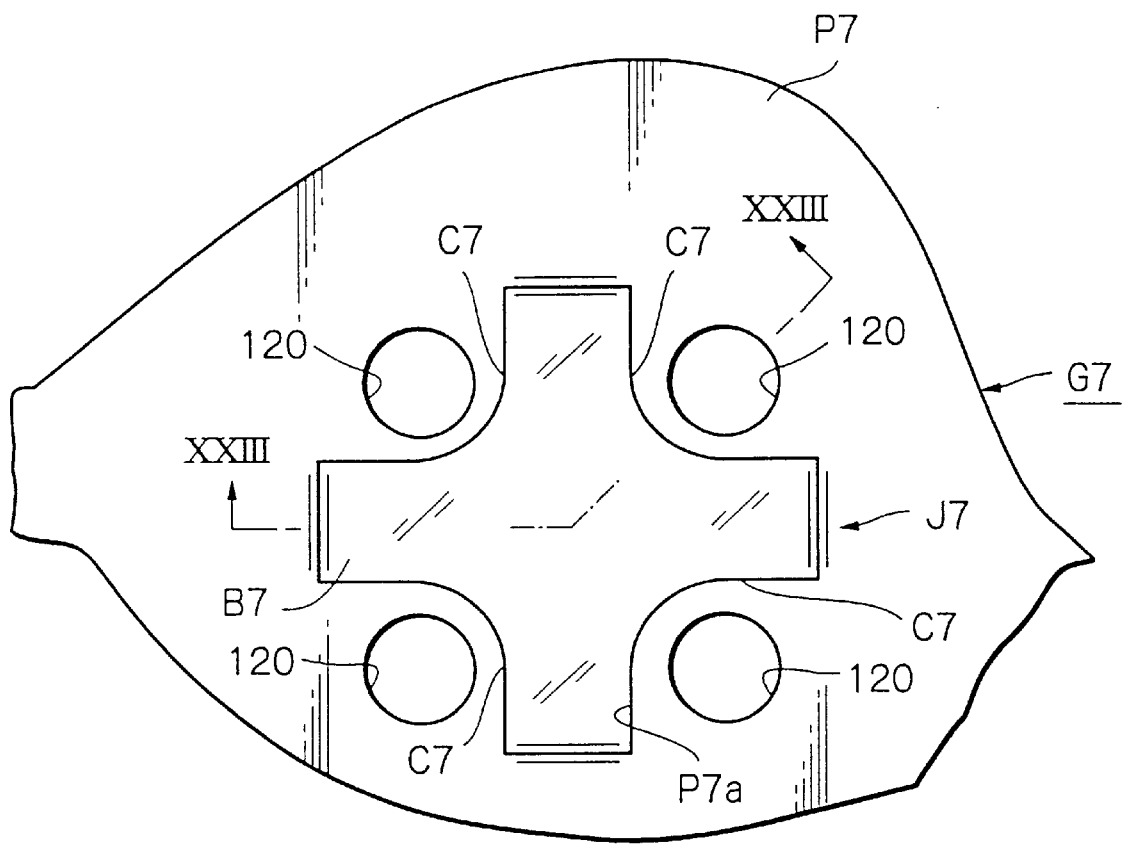
FIG. 20 is a view similar to FIG. 15, but showing a head gasket made according to a seventh embodiment of the present invention.
Figure 21:
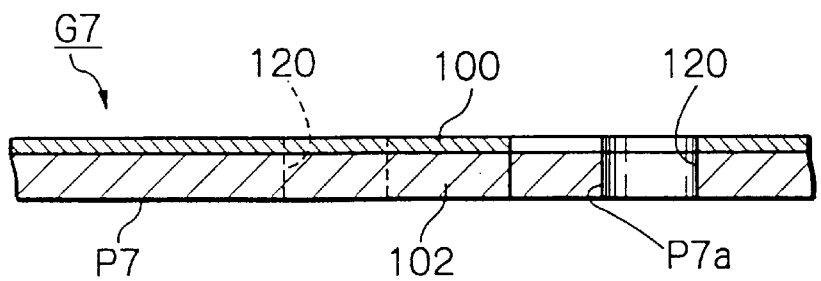
FIG. 21 is a partial sectional view showing a plurality of apertures formed in the head gasket shown in FIG. 20.
Figure 23:
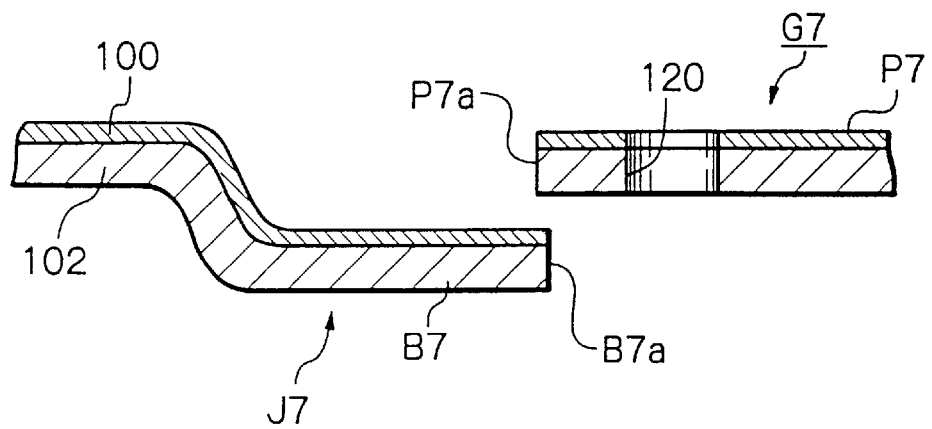
FIG. 23 is a partial sectional view showing the joint after the head gasket has been removed from the assembly.

Turning to FIGS. 20 and 21, there is shown a head gasket G7 made according to a seventh embodiment of the present invention and installed between the cylinder block 12 and the cylinder head 14. In the illustrated embodiment, the head gasket G7 is composed of two thin sheets, an upper sheet 100 and a lower sheet 102 superimposed one above the other and both made of metal. It will be appreciated that the head gasket G7 may be composed of three or more metal sheets. The head gasket G7 includes a plurality of projections P7 (only one is shown in FIG. 20) at its outer periphery. Part of the projection P7 is simultaneously cut and plastically deformed to form a joint J7. As a result, four substantially L-shaped or arcuate cut lines C7 are symmetrically formed in the projection P7 as in the fifth and sixth embodiments. The joint J7 has a substantially cross-shape as viewed in plan. The joint J7 also has a bent portion B7 with four L-shaped or arcuate side edges B5a (see FIG. 23). The bent portion B7 partly extends below the bottom of the head gasket G7 as shown in FIG. 23.

Figure 22:
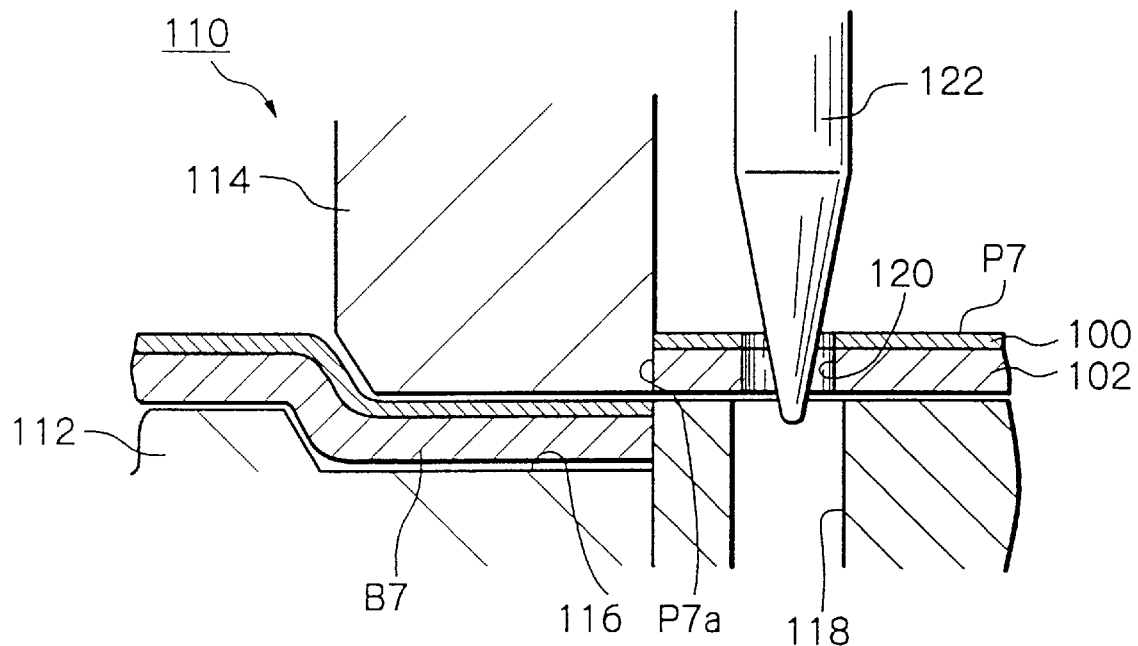
FIG. 22 is a partial sectional view showing a punch and-die assembly used to produce a joint.

FIG. 22 shows a punch-and-die assembly 110 used to form the joint J7 in the projection P7. The punch-and-die assembly 110 generally comprises a die 112, and a punch 114 located above the die 112 and moved to and from the die 112. The die 112 has a recess 116 and four bores 118 (only one is shown in FIG. 22) located around the recess 116. As shown in FIGS. 20 and 21, part of the projection P7 is die-cut to define four circular apertures 120 before the joint J7 is formed. Referring back to FIG. 22, the head gasket G7 is placed on the top of the die 112, with the apertures 120 being aligned with the bores 118. Then, the punch 114 is lowered to press the projection P7 toward the die 112. As a result, part of the projection P7 is simultaneously cut and plastically deformed to form the joint J7. The punch 114 continues to be lowered until the bent portion B7 partly projects from the lower surface of the projection P7. Four pin punches (only one is shown in FIG. 22) 122 are mounted adjacent to the main punch 114 and have a diameter slightly greater than that of the apertures 120. Immediately when the punch 114 is moved up after the bent portion B7 has been formed, these pin punches 122 are lowered to forcibly pass through the respective apertures 120. As a result, the apertures are enlarged to cause the inner side edges P7a of the projection P7 to overlie the outer side edges B7a of the bent portion B7 as shown, in a somewhat exaggerated manner, in FIG. 23. In this way, the joint J7 will in no way be moved beyond the upper surface of the head gasket G7.

As in the foregoing embodiments, the four arcuate or concaved side edges B7a of the bent portion B7 are frictionally engaged with the inner arcuate side edges P7a of the projection P7 adjacent to the cut lines C7. This engagement effectively prevents displacement of the two metal sheets 100 and 102.

Figure 24:
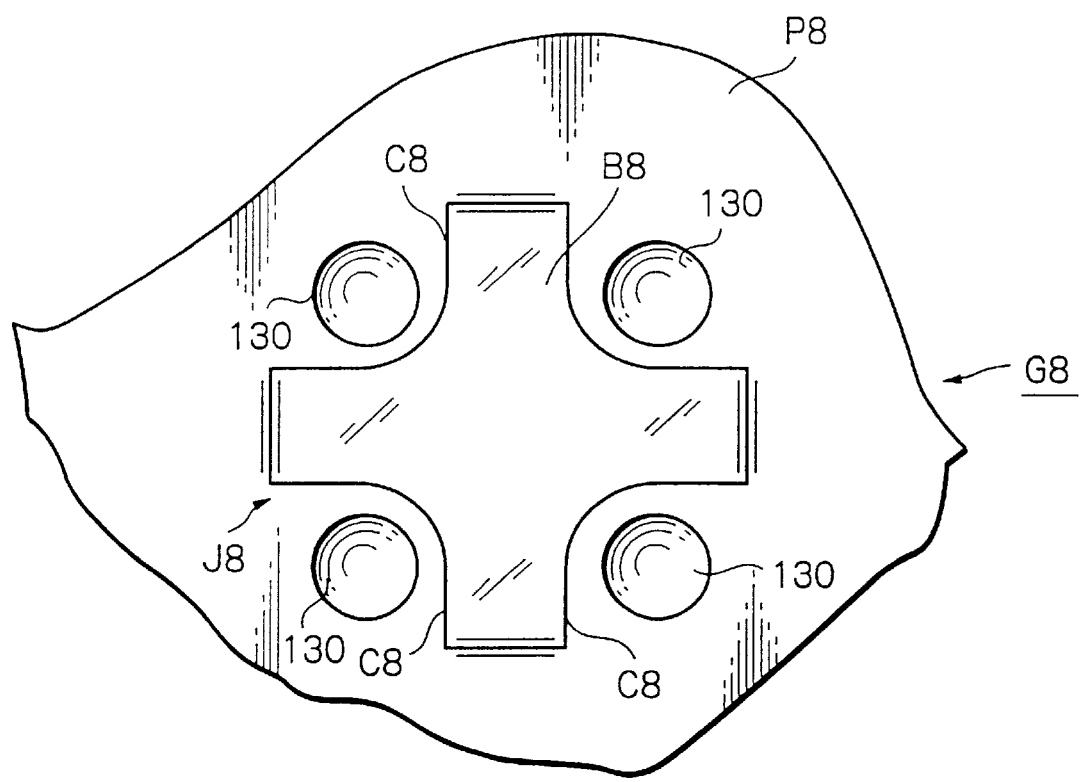
FIG. 24 is a view similar to FIG. 21, but showing a head gasket made according to a eighth embodiment of the present invention.

FIG. 24 shows a head gasket G8 made according to an eighth embodiment of the present invention and installed between the cylinder block 12 and the cylinder head 14. In the illustrated embodiment, the head gasket G8 is composed of two or more metal sheets. The head gasket G8 includes a plurality of projections P8 (only one is shown in FIG. 24) at its outer periphery. Part of the projection P8 is simultaneously cut and plastically deformed to form a joint J8. As a result, four substantially L-shaped or arcuate cut lines C8 are symmetrically formed in the projection P8. The joint J8 has a substantially cross-shape as viewed in plan. The joint J8 also has a bent portion B8 with four L-shaped or arcuate side edges. The bent portion B8 partly extends below the bottom of the head gasket G8. In this embodiment, four protrusions 130 are formed in the projection P8 before the joint J8 is formed in the projection P8. As in the fifth embodiment, these protrusions 130 are pressed or collapsed to cause the inner side edges of the projection P8 to overlie the outer side edges of the bent portion B8, as viewed in plan.

Figure 25:
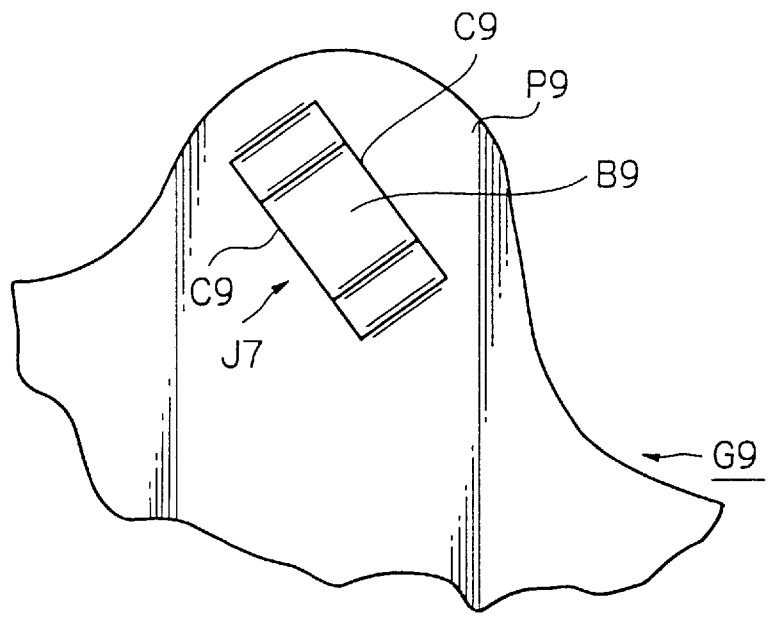
FIG. 25 is a partial plan view of a head gasket made according to a ninth embodiment of the present invention and including a rectangular joint.
Figure 29:
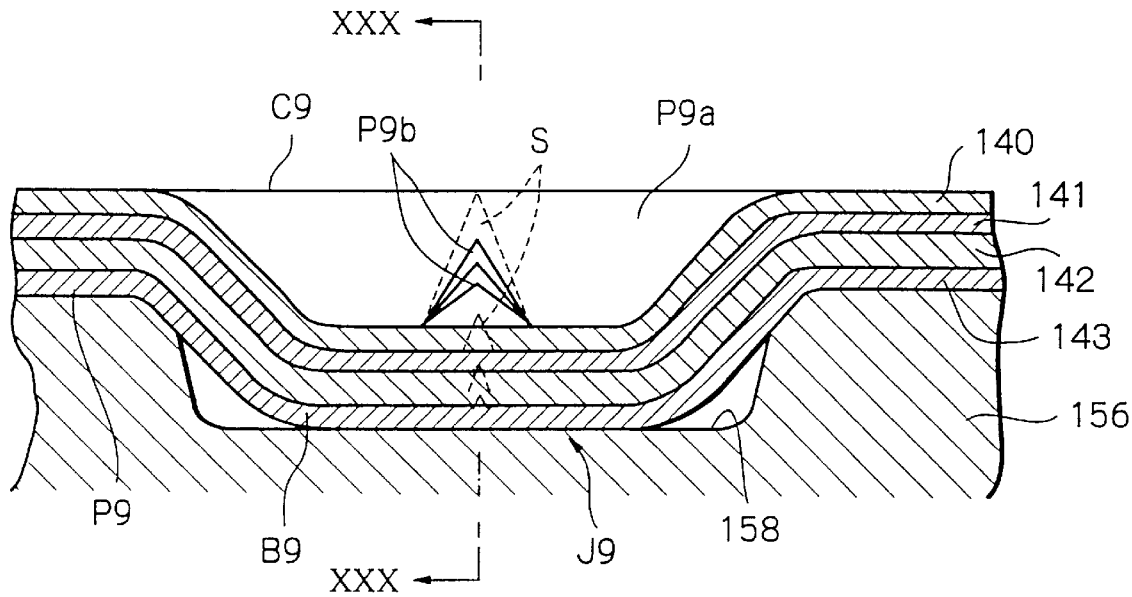
FIG. 29 is a partial sectional view of the head gasket placed on a die.
Figure 30:
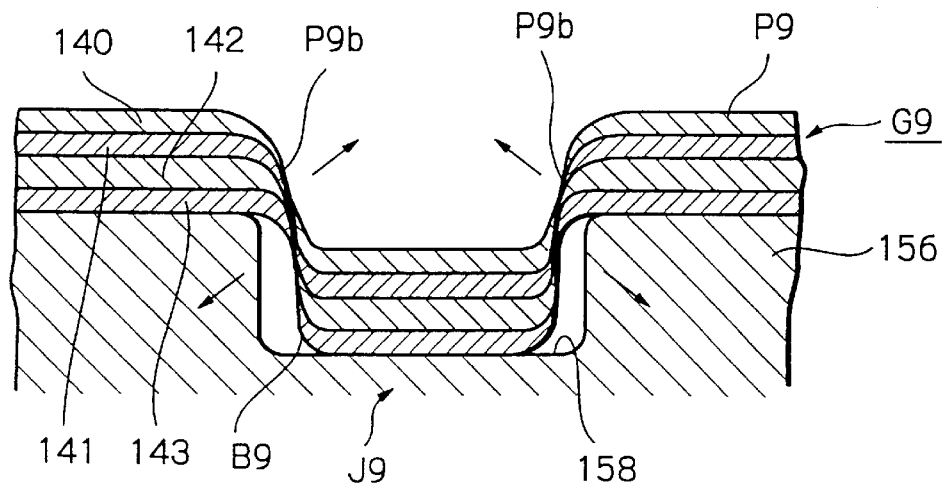
FIG. 30 is a sectional view taken along the line XXX—XXX of FIG. 29.

Referring now to FIG. 25, there is illustrated a metal gasket G9 made according to a ninth embodiment of the present invention and installed between the cylinder block 12 and the cylinder head 14. Illustratively, the head gasket G9 is composed of four thin sheets (see FIGS. 29 and 30), an upper sheet 140, two intermediate sheets 141 and 142, and a lower sheet 143, all made of metal such as stainless steel or zinc-plated steel. The head gasket G9 includes a plurality of projections P9 (only one is shown in FIG. 25) at its outer periphery. Part of the projection P9 is simultaneously cut and plastically deformed or bent downwardly to form a joint J9. As a result, a pair of straight cut lines C9 are formed in the projection P9 and extend substantially parallel to each other. The joint J9 is substantially rectangular as viewed in plan and has a bent portion B9 which partly extends downwardly from the bottom of the head gasket G9 (see FIGS. 29 and 30).

Figure 26:
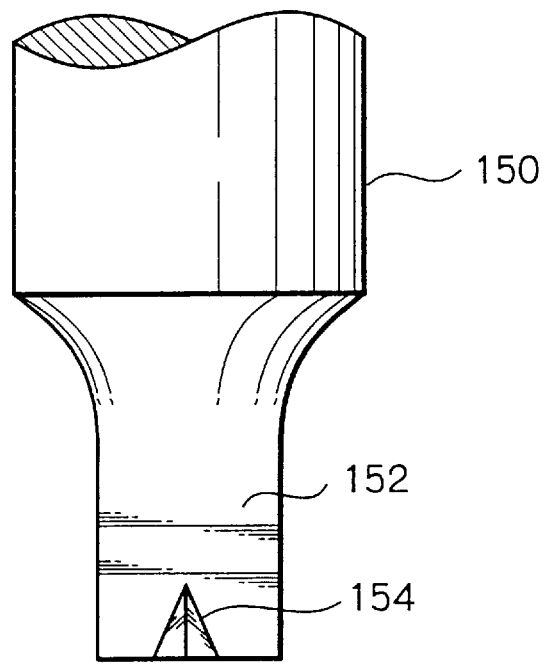
FIGS. 26 and 27 are side elevational views of a punch used to produce the head gasket shown in FIG. 25.
Figure 27:
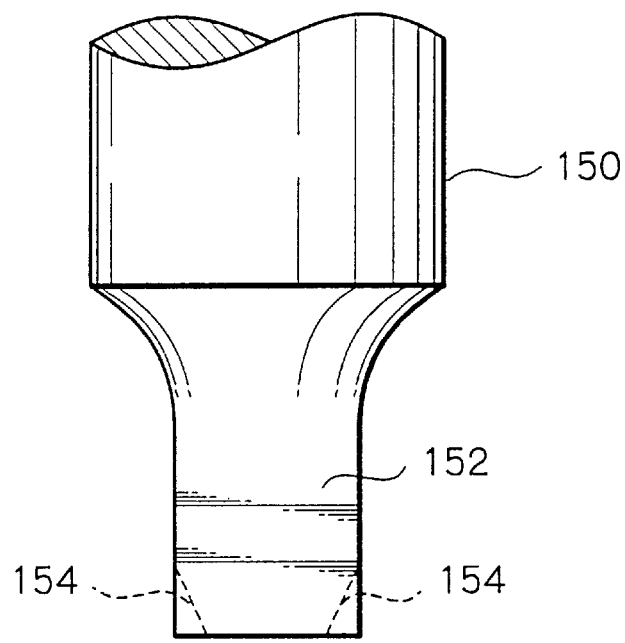
Figure 28:
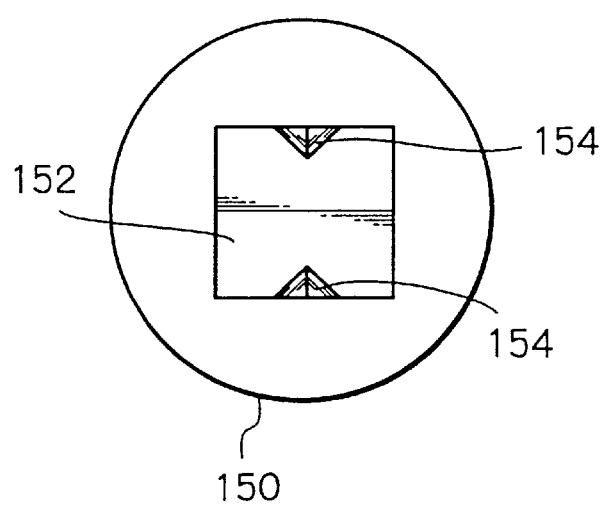
FIG. 28 is a bottom plan view of the punch shown in FIGS. 26 and 27.

As shown in FIGS. 26 and 27, a punch 150 has a square end 152. A pair of notches 154 are formed in opposite sides of the square end 152 and have a triangular cross section. The punch 150 cooperates with a die 156 (see FIGS. 29 and 30) to form the joint J9 as will be described in detail in the following paragraph.

Figure 31:
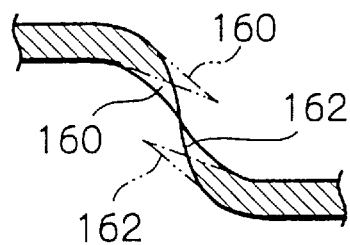
FIG. 31 is a partial view showing burrs left on opposite inner side edges of a projection.

The head gasket G9 is first placed on the top of the die 156. The die 156 has a recess 158. The punch 150 is then lowered to press part of the projection P9. As a result, that part of the projection P9 is simultaneously cut and plastically deformed to form the joint J9. At this time, spaces S are formed between the notches 154 and the inner side edges P7a of the projection P7. No shear force is applied to part of the projection P7 adjacent to the notches 154. As such, part of the projection P7, as indicated by the reference numeral P9b, is stretched in the direction of the arrows in FIG. 30 when the punch 150 is moved toward the bottom of the recess 158 of the die 156. This leaves burrs 160 and 162 on opposite side edges P9a of the metal sheets 140 to 143 as shown in FIG. 31. When the part of the projection P9 has completely been cut to form the joint J7, these burrs 160 and 162 are plastically deformed under the effect of spring back, as shown by phantom line in FIG. 31. The burrs 160 and 162 overlie as viewed in plan and effectively prevent displacement of the four metal sheets 140 to 143 and undesirable displacement of the joint J9.

Figure 32:
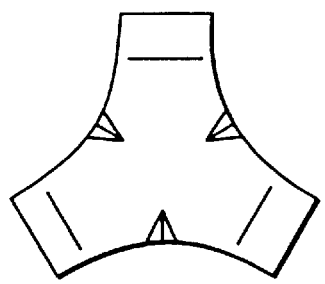
FIGS. 32 and 33 show alternative forms of the joint shown in FIG. 25.
Figure 33:
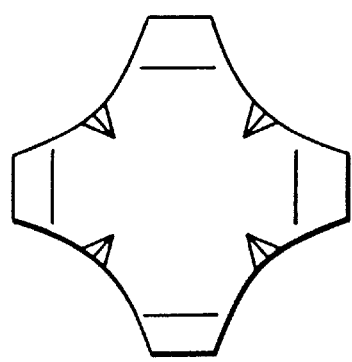

In the illustrated embodiment, the notch 154 has a triangular cross section. Alternatively, the notch may take a rectangular or other cross sectional shapes. Also, it will be appreciated that the bent portion B9 may take a Y-shape (see FIG. 32) or a cross shape (see FIG. 33).

Figure 34:
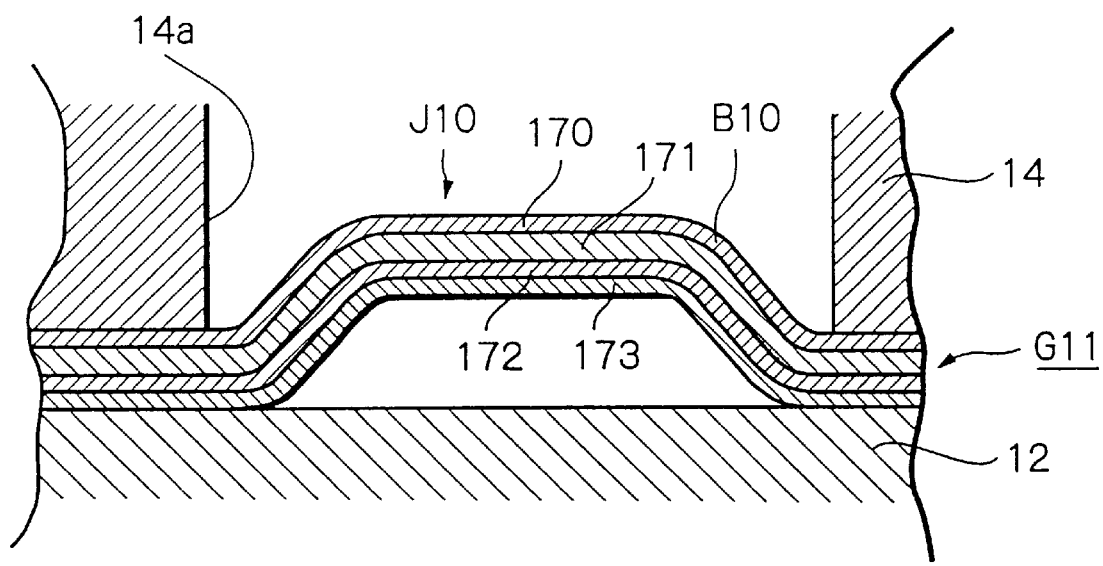
FIG. 34 shows part of a head gasket made according to a tenth embodiment of the present invention and received within a cavity of the cylinder head.

FIG. 34 shows a head gasket G10 made according to a tenth embodiment of the present invention and installed between the cylinder block 12 and the cylinder head 14 (see FIG. 1). In this particular embodiment, no projection is formed in the head gasket G10. In other words, joints are formed within the contour of the head gasket G10 without interfering with the cylinder block 12 or head 14. Typically, when the cylinder head 14 is cast from a suitable metal, a plurality of cores made from sand or loam are placed in a mold to provide holes or cavities in the casting. Conveniently, these cavities can be used to receive joints.

Referring specifically to FIG. 34, the head gasket G10 is composed of four metal sheets 170 to 173. Part of the head gasket G10 is simultaneously cut and plastically deformed or bent upwardly to form joints J10. Each of the joints J10 is received in a cavity 14a which is formed in the cylinder head 14. The method of producing the joint is similar to that described in connection with the ninth embodiment and therefore, will not be described herein.

Figure 35:
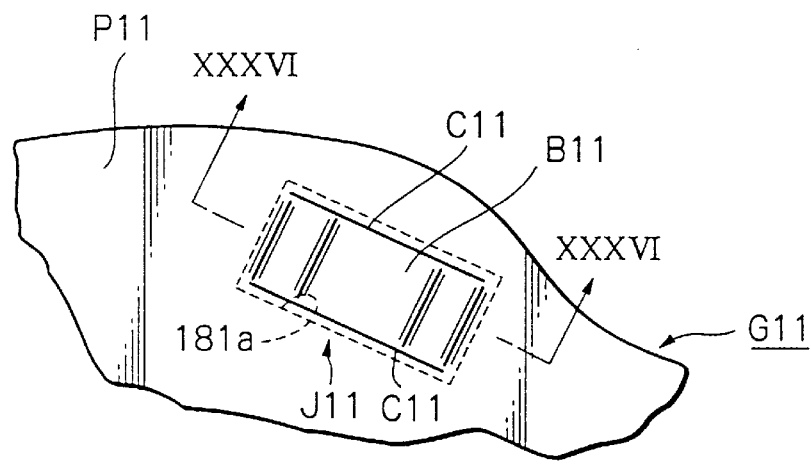
FIG. 35 is a partial plan view of a head gasket made according to a eleventh embodiment of the present invention.
Figure 36:
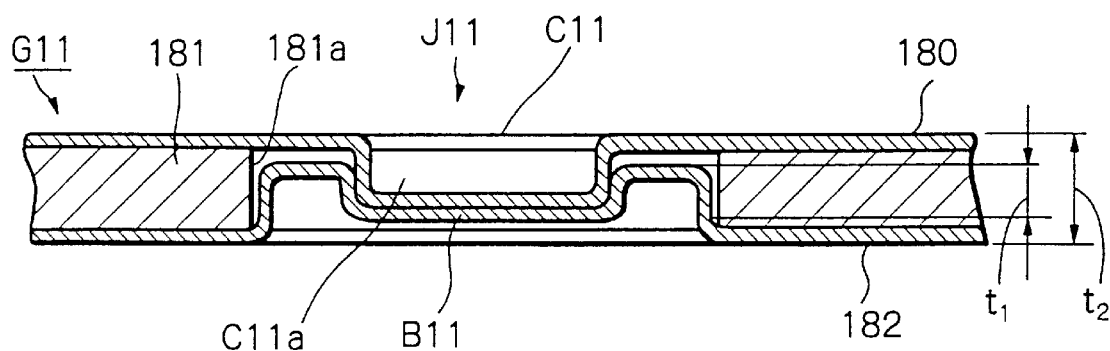
FIG. 36 is a sectional view, on an enlarged scale, taken along the line XXXVI—XXXVI of FIG. 35.

Referring to FIGS. 35 and 36, there is shown a head gasket G11 made according to an eleventh embodiment of the present invention and installed between two mating flat surfaces of the cylinder block 12 and the cylinder head 14. In this embodiment, the head gasket G11 is composed of three superimposed sheets, an upper sheet 180, an intermediate sheet 181 and a lower sheet 182, all made of metal. The intermediate sheet 181 is thicker than the other two sheets 180 and 182. The head gasket G11 includes a plurality of projections P11 (only one is shown in FIG. 35) at its outer periphery. Part of the projection P11 is simultaneously cut and plastically deformed by a suitable punch-and-die assembly (not shown) in order to form a joint J11. As a result, a pair of cut lines C11 are formed in the projection P11 and extend substantially parallel to each other. The joint J11 has a bent portion B11. As shown best in FIG. 36, the intermediate sheet 181 has a cavity or through hole 181a. The bent portion B11 has a thickness t1 which is less than the overall thickness T2 of the metal gasket G11. Advantageously, the joint J11 is completely received within the hole 181a of the intermediate sheet 181. The bent portion B11 is composed of parts of the upper and lower metal sheets 180 and 182. These parts of the upper and lower metal sheets are frictionally engaged with each other to prevent displacement of the metal sheets.

The head gasket G11 is subjected to thermal expansion and contraction as the engine 10 is repeatedly operated and stopped. As this occurs, the metal sheets 180 to 182 are subjected to displacement. To this end, the recesses 181a of the intermediate sheets 181 in the projections P11 are oriented in different directions.

Figure 37:
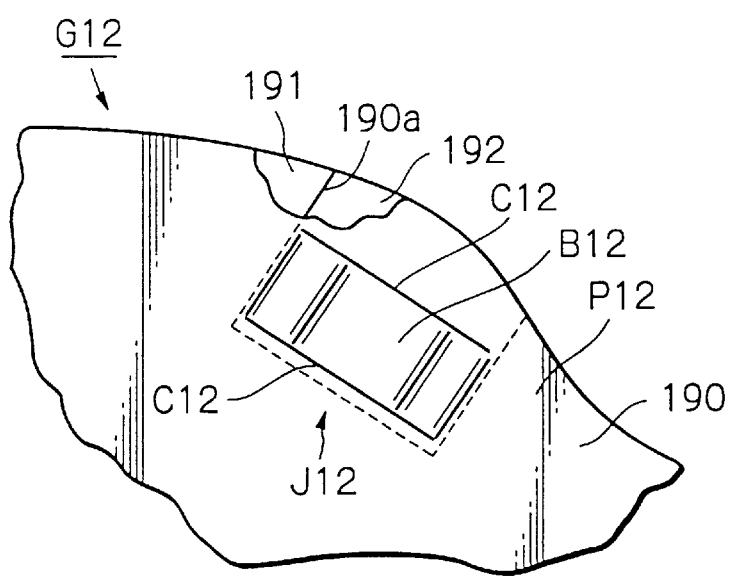
FIG. 37 is a view similar to FIG. 35, but showing a head gasket made according to a twelfth embodiment of the present invention.

FIG. 37 shows a head gasket G12 made according to a twelfth embodiment of the present invention and installed between two mating flat surfaces of the cylinder block 12 and the cylinder head 14. In this embodiment, the head gasket G12 is composed of three sheets, an upper sheet 190, an intermediate sheet 191 and a lower sheet 192, all made of metal. The intermediate sheet 191 is thicker than the other two sheets 190 and 192. The head gasket G12 includes a plurality of projections P12 (only one is shown in FIG. 37) at its outer periphery. Part of the projection P12 is simultaneously cut and plastically deformed by a suitable punch-and-die assembly (not shown) in order to form a joint J12. As a result, a pair of cut lines C12 are formed in the projection P12 and extend substantially parallel to each other. The joint J12 has a bent portion B12.

In the embodiment shown in FIG. 37, the intermediate sheet 191 has a recess or notch 191a. The bent portion B12 has a thickness which is less than the overall thickness of the metal gasket G12. Advantageously, the joint J12 is completely received within the recess 191a of the intermediate sheet 191. The rest of the structure is similar to that of the eleventh embodiment and will not be described herein.

Figure 38:
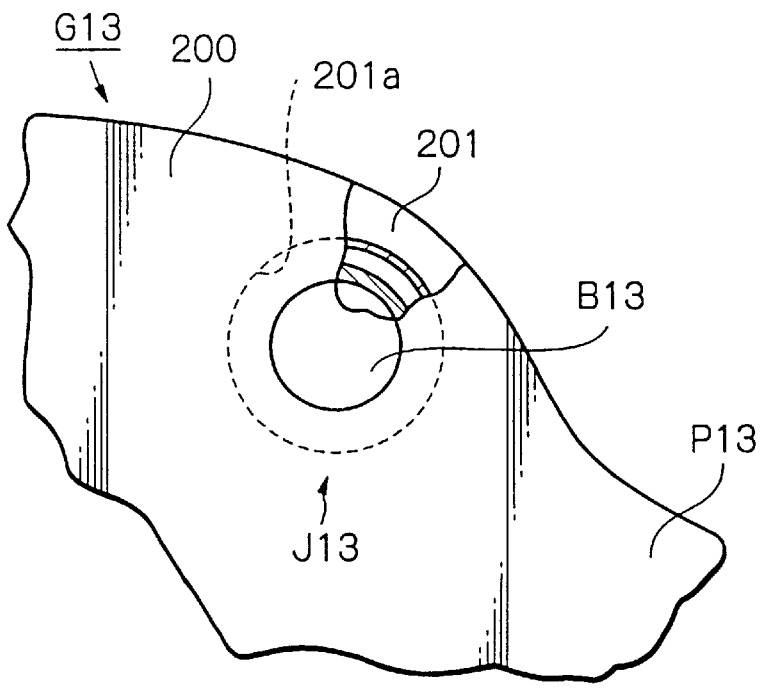
FIG. 38 is a view similar to FIG. 35, but showing a head gasket made according to a thirteenth embodiment of the present invention.
Figure 39:
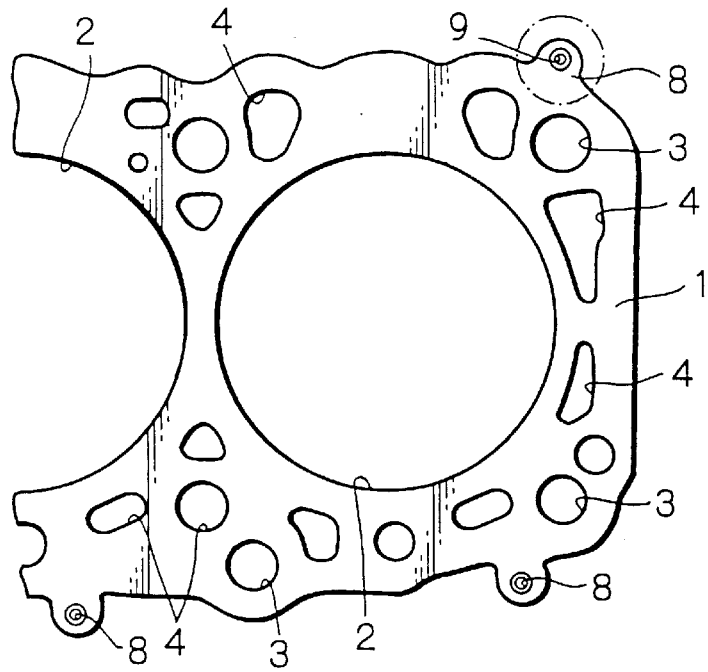
FIG. 39 is a partial plan view of a conventional head gasket.
Figure 40:
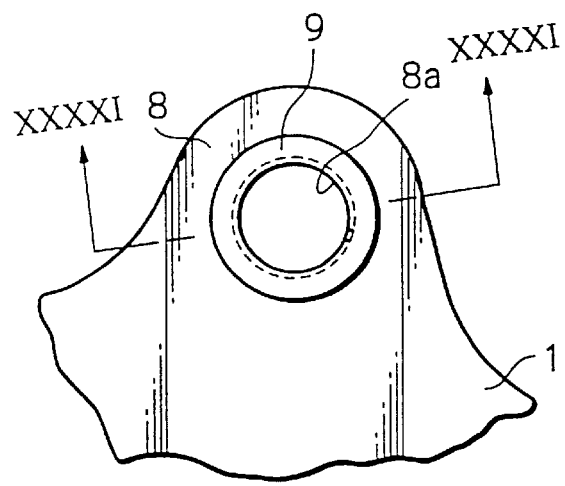
FIG. 40 is a partial view, on an enlarged scale, of the head gasket as encircled in FIG. 39.
Figure 41:
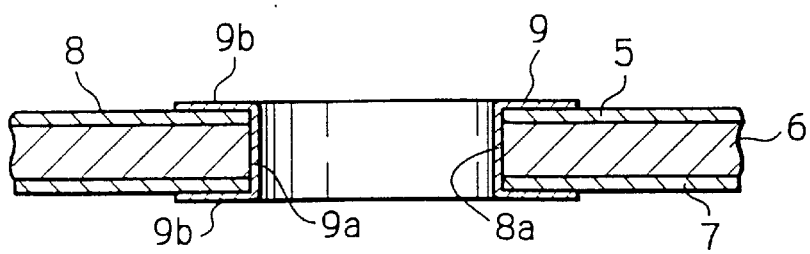
FIG. 41 is a sectional view, on an enlarged scale, taken along the line XXXXI—XXXXI of FIG. 40.

Referring next to FIG. 38, there is shown a head gasket G13 made according to a thirteenth embodiment of the present invention and installed between two mating surfaces of the cylinder block 12 and the cylinder head 14. In this embodiment, the head gasket G13 is composed of three sheets, an upper sheet 200, an intermediate sheet 201 and a lower sheet (not shown), all made of metal. The intermediate sheet 201 is thicker than the other two sheets. The head gasket G13 includes a plurality of projections P13 (only one is shown in FIG. 38) at its outer periphery. The projection P13 has a joint J13. The joint J13 has a circular bent portion B13.

In the illustrated embodiment, the intermediate sheet 201 has a cylindrical bore 201a. The upper and lower metal sheets are plastically deformed to form the bent portion B13, but no cut line is formed in the projection P13. The joint J13 is completely received or contained within the cylindrical bore 201a. The upper and lower metal sheets are frictionally engaged with each other to firmly secure the three metal sheets together and effectively prevent displacement of the three metal sheets.

In the eleventh to thirteenth embodiments, the bent portions are bent downwards. Alternatively, the bent portions may be bent upwards. Preferably, the joints have a combination of upwardly bent portions and downwardly bent portions. This arrangement effectively prevents bending of the head gaskets. It will be appreciated that heat-resistant coatings may be applied to each metal sheet so as to improve sealability.

The present invention has been described with respect to its preferred embodiment. It will be appreciated, however, that various modifications and changes may be made to the invention without departing from the spirit and the scope of the invention as defined by the appended claims.

What is claimed is:

1. A method of securing a plurality of superimposed metal sheets to produce a metal gasket with joint means, said method comprising the steps of:

forming a protrusion substantially centrally in said joint means;

cutting and plastically deforming part of said metal sheets to form a plurality of cut lines and a bent portion located between said plurality of cut lines and having outer side edges, said cut lines defining inner side edges of said plurality of metal sheets which are frictionally engaged with said corresponding outer side edges of said bent portion; and applying pressure to collapse said protrusion thereby to expand said bent portion, whereby said outer side edges of said bent portion are placed in overlapping relation to said corresponding inner side edges of said plurality of metal sheets.

2. A method according to claim 1, wherein said protrusion is substantially conical.

3. A method of securing a plurality of superimposed metal sheets to produce a metal gasket with joint means, said method comprising the steps of:

forming a plurality of protrusions in a part of said superimposed metal sheets adjacent said joint means;

cutting and plastically deforming part of said plurality of metal sheets to form a plurality of cut lines and a bent portion located between said plurality of cut lines, said bent portion having outer side edges, said cut lines defining inner side edges of said plurality of metal sheets which are frictionally engaged with said corresponding outer side edges of said bent portion; and applying pressure to collapse said plurality of protrusions thereby to expand said part of said metal sheets, whereby said inner side edges of said plurality of metal sheets are placed in overlapping relation to said outer side edges of said bent portion.

* * * * *